United States Patent [19]

Yamanaka et al.

[11] 4,318,602

[45] Mar. 9, 1982

[54] DEVICE FOR INDICATING THE READY CONDITION OF AN ELECTRONIC FLASH DEVICE

[75] Inventors: Akira Yamanaka; Toshinori Imura, both of Sakai, Japan

[73] Assignee: Minolta Camera Kabushiki Kaisha, Osaka, Japan

[21] Appl. No.: 28,763

[22] Filed: Apr. 9, 1979

[30] Foreign Application Priority Data

Apr. 10, 1978 [JP] Japan .............................. 53/47235[U]

[51] Int. Cl.³ ...................... G03B 17/20; G03B 15/02
[52] U.S. Cl. ...................................... 354/128; 354/289
[58] Field of Search .................. 354/288, 289, 32, 35, 354/53, 128, 126, 127, 133, 139, 145, 149

[56] References Cited

U.S. PATENT DOCUMENTS

| | | | |
|---|---|---|---|
| 2,455,365 | 12/1948 | Jenner | 354/127 |
| 3,443,498 | 5/1969 | Bihlmaier | 354/128 |
| 3,574,296 | 4/1971 | Prochnow et al. | 354/288 |
| 3,598,031 | 8/1971 | Harvey | 354/149 |
| 3,733,986 | 5/1973 | Hayashi et al. | 354/289 |
| 4,100,554 | 7/1978 | Iijima | 354/145 |
| 4,122,463 | 10/1978 | Tanaka | 354/289 X |
| 4,125,766 | 11/1978 | Höltje | 354/128 X |

FOREIGN PATENT DOCUMENTS

51-17021 2/1976 Japan ................................. 354/145
52-167921 12/1977 Japan ................................. 354/149

*Primary Examiner*—Donald A. Griffin
*Attorney, Agent, or Firm*—Wolder, Gross & Yavner

[57] ABSTRACT

An electronic photoflash flash device includes a case containing a photoflash network including an indicator member illuminated in the flash ready condition and transferable by a manually operable selector member from a retracted position fully housed in the case to an advance position projecting from a face of the case for wide visibility. The case is a camera body and the camera diaphragm aperture is controlled by the selector member position which also closes the network power switch when the indicator member is advanced. In one mechanism the indicator member is biased to an advanced position and the selector member is biased to a retracted position in which a member coupled thereto releasably locks the indicator member in its retracted position and when the indicator member is advanced it releasably locks the selector member in its advanced position. Alternatively the indicator member is movable with the selector member and is biased to its retracted position.

20 Claims, 6 Drawing Figures

DEVICE FOR INDICATING THE READY CONDITION OF AN ELECTRONIC FLASH DEVICE

BACKGROUND OF THE INVENTION

The present invention relates generally to improvements in devices for indicating the operative condition of an electronic flash device, and it relates more particularly to an improved light emitting device for indicating the charged condition of a camera contained electronic flash device.

A known device of the subject type includes a light emitting indication portion for indicating the charged condition of an electronic flash device and is provided in the outer face of the casing housing the light emitting portion of the electronic flash device. In such device, in order to provide the casing with a trim external appearance as well as to provide high convenience in the portability of a camera, the light emitting indication portion is embedded in the casing, so as not to project from the surface thereof.

An important drawback of the aforesaid known structure is that the light emitting indication portion located as described can be seen only by directly viewing the face of the casing in which the light emitting indication portion is embedded, but cannot be seen from any other direction, for example, from a position only transversely spaced from the aforesaid face of the casing. Accordingly, an operator must turn the camera body to observe the light emitting portion for checking the charged condition of the electronic flash device, thus experiencing great inconvenience in determining the charged condition of the electronic flash device.

SUMMARY OF THE INVENTION

It is accordingly a primary object of the present invention to provide an improved device for indicating the charged or ready condition of an electronic flash device.

It is another object of the present invention to provide an improved device for indicating the charged or ready condition of an electronic flash device, wherein a light emitting portion for indicating the charged condition of the flash device can be easily seen by directly viewing the face of a casing in which the light emitting indication portion is disposed, that is in a direction opposing such face, as well as from many other directions.

It is a further object of the present invention to provide a widely observable device for indicating the charged or ready condition of a camera contained electronic flash device in which the camera casing housing the light emitting portion of the electronic flash device has a smooth, trim and attractive appearance and great convenience of portability.

The above and other objects of the present invention will become apparent from a reading of the following description taken in conjunction with the accompanying drawings which illustrate preferred embodiments thereof.

According to the structure of the present invention, a light emitting indication means for indicating the charged or ready condition of an electronic flash device is selectively transferable between a retracted or housed position in which the indication means is housed within the casing containing the light emitting portion of the flash device, and a projecting position in which the indication means projects from the casing. With the improved structure, the light emitting indication means is maintained in the housed position within the casing when photography is effected without using the flash device, so that the outer peripheral surface of the casing is free of the projecting portion which would impair the trim and neat external appearance as well as the convenient portability of the camera or the flash device itself. Upon conducting flash photography, the indication means is caused to project from the camera body, so as to be seen from almost all directions including the direction opposed to the face of the casing in which the indication means is provided, as well as in directions at which such face is not directly observable.

DESCRIPTION OF THE PREFERRED EMBODIMENTS

Figure 1:
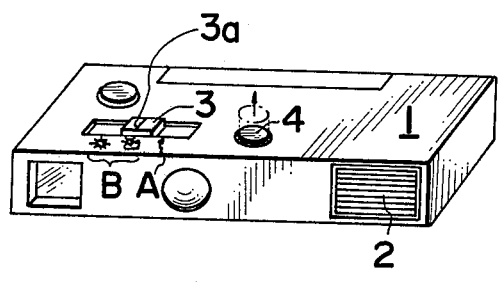
FIG. 1 is a perspective view of a camera including an indication device according to a first embodiment of the present invention.
Figure 2:
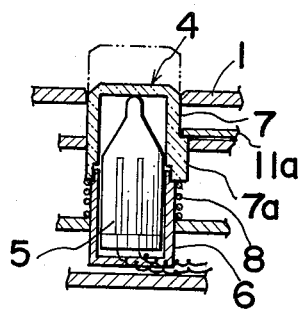
FIG. 2 is a medial longitudinal cross sectional view of the light emitting indication means included in the indication device according to the first embodiment.

Referring now to the drawings, particularly FIGS. 1 to 4 thereof which illustrate a preferred embodiment of the present invention in which the improved flash ready indicating device as well as the electronic flash unit which may be of conventional construction are self-contained in a camera body which defines the casing of the light emitting portion of the electronic flash device, reference numeral 1 generally designates a camera body of flat rectangular paralleopiped configuration which receives and employs a cartridge of film (a product of Eastman Kodak Company, U.S.A.) of the so-called 110 film size or type and which incorporates therein a light emitting portion 2 of a camera body self-contained electronic flash device of generally known construction. The camera includes a switching or transfer member or a mode selecting member 3 for changing over or selecting the photographing or picture-taking mode of the camera between a flash photographing mode, in which the flash device is used in photographing and a daylight photographing mode in which no flash is used. Switching member 3 has an indicia 3a on the top surface thereof, and is interconnected with a control mechanism provided within the camera body, so that when indicia 3a thereof is brought into coincidence with a flash photographing mark A provided on a face of the camera body, then the camera is set to the flash photographing mode, and when indicia 3a is brought into coincidence with one of the daylight photographing marks B, then the camera is set in the daylight photographing mode. Switching member 3 functions as well to adjust the objective lens diaphragm in the known manner to vary the size of the diaphragm aperture (not shown) by setting the indicia 3a selectively to one of daylight photographing marks B representing the exposure conditions. A light emitting indication means 4 indicates the ready or charged condition of the electronic flash device incorporated in the camera body in a known manner, that is, energization or illumination of means 4 indicates the properly charged condition of a capacitor storing therein the electric energy for energization of the light emitting electronic flash tube. Light emitting indication means 4, as best seen in FIG. 2, consists of a lamp 5, such as a neon lamp, a lamp holder 6, and a transparent cap 7 secured to lamp holder 6 and serving as a lamp protective cover. Lamp 5 is connected to a known flash circuit (not shown) whereby to be lit or intermittently flashed upon completion of the charging to the aforesaid storage capacitor included in the flash circuit. Light emitting indication means 4 is transferably or displaceably supported for movement between a retracted or housed position, in which it is located substantially fully within the camera body, as shown by a solid line in the drawings and a projecting or advanced position in which cap 7 projects from the face of the camera body, as shown by a phantom line. Indication means 4 is so loaded or biased as to be displaced to its projecting position under the influence of a helical spring 8.

Figure 3:
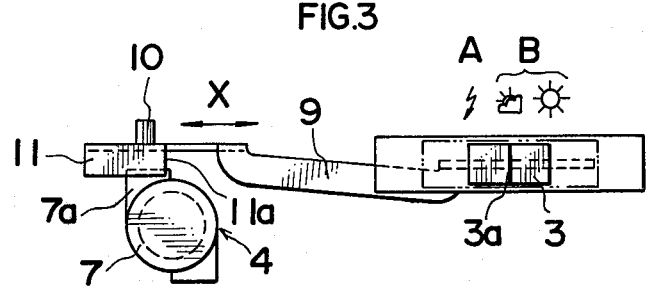
FIG. 3 is a plan view of a part of the device shown in FIG. 1.
Figure 4:
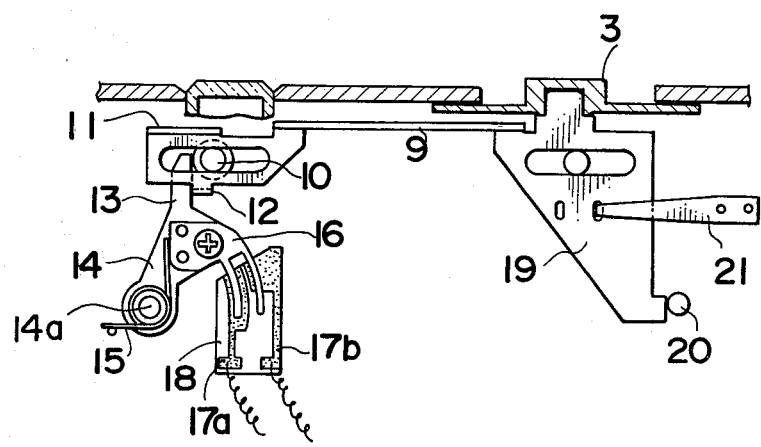
FIG. 4 is an elevational view of a part of the device shown in FIG. 1.

FIGS. 3 and 4 illustrate a mechanism for controlling transfer or displacement of light emitting indication means 4 respectively which mechanism includes an interlocking or transmission member 9 connected at one end to switching member 3 and being laterally or longitudinally slidably movable in the X-directions under the restriction or guidance of a slot engaging pin 10 substantially perpendicular to the direction of shift of light emitting indication means 4 when switching member 3 is shifted. Interlocking member 9 has at its other end opposite member 3 a lock piece or flange 11 movable into or out of the path or locus of movement of an engaging projection 7a formed integrally with the light emitting indication means 4, and also has formed at such other end a switch actuating portion 12. A switch lever 14 having an arm 13 located in the path of movement of switch actuating portion 12 is rotatably supported by a shaft 14a, which in turn is anchored to a fixed portion of the camera body, and is so loaded or biased that arm 13 normally engages switch actuating portion 12 under the influence of spring 15. A sliding contact piece 16 attached to the switch lever 14 has a forked end normally maintained in sliding contact with an electrically insulated plate 18 having fixed contact pieces 17a and 17b, and is movable between a contact open position interrupting the flow of current, as shown, to a contact closed position allowing the flow or supply of current, in which the forked end portion of piece 16 makes a bridge connection between fixed contact pieces 17a and 17b. Fixed contact pieces 17a and 17b are connected to a power source network included in the flash circuit (not shown), and constitutes a power source switch in cooperation with the sliding contact piece 16. Positioned below switching member 3 and formed integrally with interlocking member 9 is a control member 19 for controlling the size of the diaphragm aperture, not shown. An interlocking pin 20 follows control member 19. When switching member 3 is shifted from one mark to another in the daylight photographing position B, interlocking pin 20 operates to vary the size of the diaphragm aperture to a value commensurate with the set position, and when switching member 3 is set at the flash photographing mark A, the pin operates to vary the diaphragm aperture to a predetermined size for the flash photographing or to interconnect the diaphragm mechanism with a distance setting member (not shown), so that the size of the diaphragm aperture is automatically adjusted to a value which is a function of the quantity of light being emitted (guide number) by the flash device as well as the set focal length. Shown at 21 is a leaf spring for click stopping or position switching member 3 at a desired set point.

Considering now the operation of the apparatus described above and referring to FIGS. 3 and 4 wherein switching member 3 is shown as set to one of the daylight photographing marks B so that the camera is in the daylight picture-taking mode, when the indicia of switching member 3 is selectively set to either one of the marks in the daylight photographing position B, which represents the respective exposure condition, then the objective lens diaphragm aperture is set in the known manner to a daylight photographing value by means of control member 19 and interlocking or follower pin 20. The aforesaid shift of the switching member 3 causes displacement of the lock piece 11 and switch actuating portion 12 which are formed at a corresponding end of interlocking member 9. Displacement of these portions is along a clearance or inactive path in which lock piece 11 still remains within the locus or path of movement of engaging portion 7a of light emitting indication means 4 and in engagement with the engaging portion 7a, to thereby retain the light emitting indication means 4 locked in its retracted position as shown in FIGS. 3 and 4. Moreover, such shift or movement of switching member 3 causes switch actuating portion 12, switch lever 14 and hence sliding contact piece 16 to shift only a limited amount whereby sliding contact piece 16 advances only a small distance, insufficient to establish a bridge connection between fixed contact pieces 17a and 17b so that the flash device power source switch remains open.

In order to transfer the picture-taking mode of the camera from a daylight photographing condition to a flash photographing condition, switching member 3 is moved so as to advance indicia 3a into registry with flash photographing mark A provided on a face of the camera body. The shift of switching member 3 to the flash photographing position advances interlocking member 9 interconnected therewith to thereby retract lock piece 11 formed at the other end of interlocking member 9 to a position out of the locus or path of movement of engaging portion 7a of the light emitting indication means, and at the same time, switch lever 14 is rotated counterclockwise by switch actuating portion 12 against the force of spring 15. When lock piece 11 has been completely retracted from the path or locus of movement of the engaging portion 7a of indication means 4, then light emitting indicating means 4 is urged upwards to the projecting position as shown by a phantom line in FIGS. 1 and 2 under the influence of spring 8 bearing outwardly on the indication means. The counterclockwise rotation of switch lever 14 concurrent therewith causes sliding contact piece 16 to advance to a position in which it contacts both fixed contacting pieces 17a and 17b, thereby closing the power source switch and allowing current to flow to and energize and actuate the flash circuit not shown. When the charging is complete, that is when the storage capacitor charge reaches a predetermined value after the lapse of a predetermined time, then lamp 5 is ignited or intermittently flashed as an indication of the completion of the charging and is observable through transparent cap 7. Under this condition, interlocking member 9 is biased to return to the daylight photographing position under the force of spring 15 acting through switch lever 14. However, the interlocking member 9 is retained in its flash photographing position by the engagement of the inner edge portion 11a of lock piece 11 with engaging portion 7a of the light emitting indication means 4 displaced or advanced to its projected position. By the engagement of the lock piece with the engaging portion, switching member 3 is locked in its flash photographing position, without the risk of its being inadvertently manipulated to the daylight photographing position.

In order to transfer the picture taking mode of the camera from the flash photographing to the daylight photographing as shown in FIGS. 1 through 4, cap portion 7 of the light emitting indication means, which in the camera flash photographing mode projects from the plane or face 4 of the camera body is depressed into the camera body until the indication means 4 reaches its housed or retracted position with the camera body. At this time, interlocking lever 9 is released from engaging portion 7a of light emitting indication means 4 and is spring advance to its daylight photographing position, thereby allowing lock piece 11 to intercept the locus or path of movement of engaging portion 7a. The displacement of light-emitting indication means 4 to the projecting position is thus prevented by the lock piece 11, and hence the light emitting indication means is reliably retained in the housed or retracted position (FIGS. 2 and 3). The aforesaid retraction movement causes switch lever 14 to resume the position shown in FIG. 4 under the influence of spring 15, whereby sliding contact piece 16 is returned to the position shown in FIG. 4 in which it does not effect a bridge-connection or shorting between fixed contacts 17a and 17b, thereby transfering the power source switch to its open position.

In the above-described embodiment, the light emitting indication means is so constructed as to be wholly shifted as a unit. As an alternative, lamp 5 and lamp holder 6 may be fixed to the camera body, and the cap member 7 alone may be displaceable between the housed position and the projecting position. In this connection, the cap member should preferably be made of a light diffusive material. Furthermore, since the switching member 3 performs a plurality of functions including the function of transfering the picture-taking mode of the camera between flash photography and the daylight photography and the function of a diaphragm setting member, there results a reduction in the number of parts. Moreover, the setting of the diaphragm aperture and the transfering of the camera between two different picture-taking modes are achieved by the operation of a single member, with the resulting convenience and ease of handling.

Additionally, once switching member 3 which possesses the function of a diaphragm setting member is set to the flash photographing position, then the switching member is locked at the flash photographing position and cannot be directly manipulated. As a result of such arrangement, there is eliminated any risk that an operator may inadvertently effect an adjustment of the diaphragm on the occasion of flash-photographing and a picture is taken with the diaphragm aperture improperly set, unlike a camera having a diaphragm setting member movable at any time, thus ensuring that flash photography is performed at the proper exposure.

Also in this embodiment, the transfer of the picture-taking mode from flash photography to daylight photography is accomplished by depressing light emitting indication means 4 into the camera body, which means is distinct and separate from switching member 3 and is displaceable in a direction different from the direction of movement of the switching member, thus eliminating the risk that an operator may inadvertently operate the switching member at flash photography and effect the unwanted change in the picture taking mode from the flash photographing mode to the daylight photographing mode.

Figure 5:
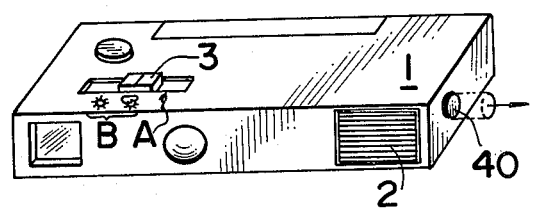
FIG. 5 is a perspective view similar to FIG. 1 of a second embodiment.
Figure 6:
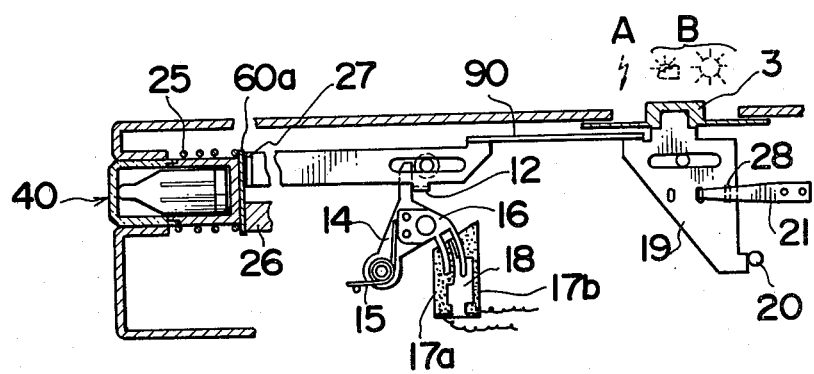
FIG. 6 is a fragmentary elevational view of the internal mechanism of the indication device shown in FIG. 5.

Referring now to FIGS. 5 and 6 which show another embodiment of the present invention in which the components common to those of the first embodiment are identified by the same reference numerals and given no further description, a light emitting indication means 40 is biased by a spring 25 to a camera body housed or retracted position. When light emitting indication means 40 is in its retracted or housed position, a vertical inner wall 60a thereof, as viewed in FIG. 6, engages a stop or abutment 26 formed on a fixed portion of the camera body. An interlocking or transmission member 90 has switch actuating portion 12 and control member 19 like those in the first embodiment. Interlocking member 90 is formed at one end with a bent portion 27 in opposed or confronting relation to vertical inner wall 60a of the light emitting indication means. When switching member 3 is shifted or transfered from the daylight photographing position to the flash photographing position A, interlocking member 90 is shifted in association with the displacement of the switching member, whereby the vertical inner wall 60a of the light emitting indication means 40 is urged outwardly by bent portion 27 so that the light emitting indication means 40 is advanced to its projecting position as shown by broken line in FIG. 5. In this condition, interlocking member 90 is biased in a return direction to the daylight photographing position under the influence of spring 15 through switch lever 14, as in the first embodiment. The movement of the interlocking member to the daylight photographing position, however, is restrained by the engagement of leaf spring 21 with one of click slots 28 in control member 19. In order to transfer the picture taking mode of the camera from flash photography to daylight photography, switching member 3 is manipulated or light emitting indication means 4 is depressed by an operator to its retracted or housed position, so that the respective members resume the conditions as shown in FIGS. 5 and 6, respectively. The camera is thus reset to the daylight photographing mode.

In the second embodiment, the light emitting indication means 40, normally spring-biased to its housed position, is pushed by interlocking member 90 to its projection position. As an alternative, the light emitting indication member 40 may be rigidly secured to one end of interlocking member 90, in a manner to be displaceable between an advanced projecting position and a retracted housed position. In the latter case, spring 25 is not needed and may be eliminated with a reduction in the number of parts.

While in the described embodiments, reference is made to a lamp as being used as the light source for the light emitting indication means, other light emitting elements, such as a neon lamp or a light emitting diode may be employed, or any other such element which may be lit or intermittently flashed on receiving a suitable signal representing the completion of charging from the flash circuit. In the described embodiments, the light emitting indication means as a whole or only the transparent cap 7 constituting a part of the light emitting indication means may be displaced to the projecting position. Alternatively, the light source may be fixed, and in turn, a light conducting member for optically guiding the light from the light source may be provided in a manner to be transferred between a position projecting from the camera body and a retracted position housed within the camera body.

Moreover, in the described embodiments, the electronic flash device is shown as being incorporated or self-contained in the camera for descriptive convenience. However, the present invention is applicable as well as to an electronic flash device, independent of the camera. In such a case, the casing in which the light emitting portion is housed is the body proper of the electronic flash device and not a camera body.

According to the present invention, since the light emitting indication means for indicating the charged condition of the flash circuit is so arranged as to be selectively set in a housed or retracted position and at the projecting position in which it projects from the casing housing the light emitting portion of the electronic flash device, if the light emitting indication means is set at its projecting position at flash photography, then the light-emitting indication means may be seen in a direction toward the face of the casing from which the indication means projects, as well as from a direction angularly related in the aforesaid direction. The charged condition of the electronic flash device may thus be easily visually determined from any direction. Since the indication means is set at the housed position in the daylight photographing mode, the neat and trim appearance of the casing as well as the convenient portability of the camera or the flash device itself are ensured.

Since, in the mechanisms of the present invention, light emitting means 4 and switching member 3 are mutually interconnected so that the indication means is automatically advanced to its projecting position in association with the movement of the switching member to the flash photographing position, and when the switching member is set at the daylight photographing position, the light emitting indication means is retracted from the projecting position to the housed position, then an operator can easily observe from the position of the switching member as well as from the position of the light emitting indication means which mode has been selected, the flash photographing or the daylight photographing mode.

While there have been described and illustrated preferred embodiments of the present invention, it is apparent that numerous alterations, omissions and additions may be made without departing from the spirit thereof.

What is claimed is:

1. A combination photographic camera and photoflash device comprising:
   a photographic camera mechanism;
   a flash device including a light projecting member;
   housing means for accomodating said photographic camera mechanism and said flash device;
   a light emitting indication means illuminated in response to the readiness of said flash device to activate said light projecting member and characterized in being movable between a retracted position and projecting position in which at least a part of said indication means projects from an outer surface of said housing means;
   a power source switch for said flash device;
   a manually operable means movable between an inoperative position for opening said switch and an operative position for closing said switch; and
   advancing means for moving said indication means from said retracted to said projecting position in response to the movement of said manually operable means to said operative position.

2. The device as set forth in claim 1 wherein said advancing means includes a first biasing means urging said indication means toward its projecting position, and a retaining member connected to said operable means and being positioned in the moving path of said indication means for retaining it at its retracted position when said operable means is in its inoperative position and being positioned out of said moving path for permitting the movement of said indication means from its retracted to projecting position when said operable meanns is in its operative position.

3. The device as set forth in claim 2 further comprising a second biasing means for urging said manually operable means toward said inoperative position, and a lock means having a deactuated condition and a actuated condition for locking said operable means at its operative position, said lock means being actuated upon said indication means being positioned in its projecting position whereby said manually operable means is maintained in said operative position upon being advance thereto.

4. The device as set forth in claim 1, wherein said photographic camera mechanism includes a diaphragm aperture adjusting device and said manually operable means includes a diaphragm control member interlocked with said diaphragm aperture adjusting device.

5. The device as set forth in claim 1, wherein said advancing means includes biasing means for urging said indication means toward its retracted position, and an operating member for moving said indicating member from its retracted to projecting position against the influence of said biasing means.in response to the movement of said manually operable means to its operative position.

6. A combination photographic camera and photoflash device comprising:
   a photographic camera mechanism;
   a flash device including a light projecting member;
   housing means for accomodating said photographic camera mechanism and said flash device;
   a light emitting indication means illuminated in response to the readiness of said flash device to activate said light projecting member and characterized in being movable between a retracted position and a projecting position in which at least a part of said indication means projects from an outer surface of said housing means;
   a power source switch connected to said flash device; and
   means for closing and opening said switch in relation to the movement of said indication means and maintaining said switch in closed condition when said indication means is positioned in its projecting position.

7. In a casing containing an electronic flash circuit, the combination comprising:
   a flash emitting member electrically connected to said circuit;
   a light emitting indication means connected to said circuit for indicating the readiness for photoflash light emission of said flash emitting member by a light signal, said means being movable between a retracted position and a projecting position in which said indication means projects out of said casing;

a power source switch connected to said circuit; and means for closing and opening said switch in relation to the movement of said indication means and maintaining said switch in closed condition upon said indication means being positioned in its projecting position and opening said switch upon said indication means being positioned at its retracted position.

8. A combination as set forth in claim 7 further comprising a first biasing means for urging said indication means from said retracted position to said projecting position, and retaining means externally accessible to be moved between a retaining position for retaining said indication means in its retracted position and a release position for permitting the movement of said indication means to its projecting position.

9. A combination as set forth in claim 8 further comprising a second biasing means for urging said retaining means toward its retaining position, and lock means for locking said retaining means at its release position against the influence of said first biasing means upon said indication means being positioned in its projecting position.

10. An electronic photoflash device comprising:

a case containing an electronic photoflash network including an indicator member illuminated in response to the flash ready condition of said photoflash network;

means supporting said indicator member for movement between a retracted position housed within said case and an advanced position projecting from a face of said case;

an externally accessible selector member;

spring means urging said indicator towards its advanced position; and coupling means operatively coupling said selector member to said indicator member, said coupling means including means responsive to a first position of said selector member releasably locking said indicator member in its retracted position.

11. The electronic flash device of claim 10 wherein said coupling means includes means releasably locking said selector member in a predetermined second position in response to the advanced position of said indicator member.

12. The electronic flash device of claim 11 including spring means urging said selector member toward said first position.

13. An electronic photoflash device comprising a case containing an electronic photoflash network including a switch connecting said network to a source of current and an indicator member illuminated in response to the flash ready condition of said photoflash network, means supporting said indicator member for movement between a retracted position housed within said case and an advanced position projecting from a face of said case, transfer means for moving said indicator member to its advanced position, and means for closing said switch in relation to the movement of said indicator member to its advanced position.

14. An electronic photoflash device comprising a case including a camera body member having a diaphragm aperture control member and containing an electronic photoflash network including an indicator member illuminated in response to the flash ready condition of said photoflash network, means supporting said indicator member for movement between a retracted position housed within said case and an advanced position projecting from a face of said case, transfer means for selectively positioning said indicator member in its advanced and retracted positions and including a manually movable selector member and means operatively coupling said selector member to said indicator member, and means coupling said selector and diaphragm control members for adjusting said control member in response to the position of said selector member.

15. A combination photographic camera and photoflash device comprising:

means for delineating an outer periphery of the device;

an electronic photoflash network;

an indicator member connected to said photoflash network for indicating the flash ready condition of said photoflash network by a light signal, said indicator member being movable between a retracted position and a projecting position in which said indicator member projects from said delineating means;

a power source switch connected to said photoflash network; and means for closing and opening said switch in relation to the movement of said indicator member and maintaining said switch in closed condition upon said indicator member being positioned in its projecting position and opening said switch upon said indicator member being positioned in its retracted position.

16. The device as set forth in claim 15 further comprising means for urging said indicator member toward its projecting position, a manually operable member selectively positioned at one of a plurality of setting positions including a specific setting position, and means for releasably locking said indicator member in its retracted position, said locking means being interlocked with said manually operable member so as to release the lock of said indicator member in response to the movement of said manually operable member to said specific position.

17. The device as set forth in claim 16 further comprising a diaphragm mechanism and wherein said manually operable member includes a diaphragm setting member connected to said diaphragm mechanism for adjusting the aperture size of said diaphragm mechanism.

18. A combination photographic camera and photoflash device comprising:

a photoflash network including a switch transferable between a closed position energizing said network and an open position;

means housing said photoflash network;

an indicator member movable between an advanced position projecting from said housing and a retracted position and illuminated in response to the flash ready condition of said photoflash network; and means opening and closing said switch with said indicator member being in its retracted and advanced positions respectively.

19. The combination of claim 18 comprising a camera mechansim contained in said housing means, means for adjusting a parameter of said camera mechanism and means responsive to a predetermined position of said adjusting means for advancing said indicator member.

20. The combination of claim 19 wherein said camera mechanism includes a diaphragm aperature control member and said adjusting means is coupled to said control member.

* * * * *